United States Patent
Yamamoto et al.

(10) Patent No.: US 8,073,574 B2
(45) Date of Patent: Dec. 6, 2011

(54) DRIVING ASSIST METHOD AND DRIVING ASSIST APPARATUS FOR VEHICLE

(75) Inventors: Yukio Yamamoto, Okazaki (JP); Yumi Shibata, Okazaki (JP); Katsuya Maruyama, Okazaki (JP)

(73) Assignee: Aisin Aw Co., Ltd., Anjo-Shi, Aichi (JP)

( * ) Notice: Subject to any disclaimer, the term of this patent is extended or adjusted under 35 U.S.C. 154(b) by 1131 days.

(21) Appl. No.: 11/603,309

(22) Filed: Nov. 22, 2006

(65) Prior Publication Data

US 2007/0118282 A1 May 24, 2007

(30) Foreign Application Priority Data

Nov. 22, 2005 (JP) ................. 2005-337680

(51) Int. Cl.
- G05D 1/00 (2006.01)
- G06F 17/00 (2006.01)
- G06G 7/78 (2006.01)
- B60T 8/32 (2006.01)

(52) U.S. Cl. ............... 701/1; 701/70; 701/96; 701/300; 303/138; 340/901; 340/988; 340/995.25; 180/167

(58) Field of Classification Search .............. 701/1, 36, 701/48, 49, 70, 71, 79, 93, 96, 116, 200, 701/207, 208, 211, 220, 223, 225, 300, 301; 303/1, 138, 183, 191, 193; 340/901, 903, 340/905, 932.2, 943, 988, 989, 990, 994, 340/995.1, 995.14, 995.15, 995.17, 995.2, 340/995.23, 995.25; 188/1.11 R; 180/167, 180/170

See application file for complete search history.

(56) References Cited

U.S. PATENT DOCUMENTS

| | | | |
|---|---|---|---|
| 6,253,150 | B1 | 6/2001 | Nakamura |
| 2004/0054449 | A1 | 3/2004 | Villaume et al. ............. 701/16 |
| 2004/0090117 | A1 | 5/2004 | Dudeck et al. ............. 303/191 |

FOREIGN PATENT DOCUMENTS

| | | |
|---|---|---|
| DE | 19800202 | 7/1999 |
| DE | 19940718 | 5/2001 |
| EP | 1146497 | 10/2001 |
| GB | 2224475 | 5/1990 |
| JP | 8-178679 | 7/1996 |
| JP | 2002-156233 | 5/2002 |
| JP | 2002-163795 | 6/2002 |
| JP | 2004-101280 | 4/2004 |
| JP | 2005-127749 | 5/2005 |
| JP | 2005-148973 | 6/2005 |
| JP | 2005-165423 | 6/2005 |

Primary Examiner — Tuan C. To
Assistant Examiner — Edward Pipala
(74) Attorney, Agent, or Firm — Bacon & Thomas, PLLC

(57) ABSTRACT

Responsive to braking, a CPU of a driving assist apparatus calculates an average deceleration of the vehicle and then calculates a braking distance. The CPU further calculates a final position at which the vehicle will come to a stop, on the basis of the braking distance. The CPU next activates an assist display for display a map including, superimposed thereon, the route to the final position and an arrival indicator indicating the stop (final) position of the vehicle.

16 Claims, 7 Drawing Sheets

DRIVING ASSIST METHOD AND DRIVING ASSIST APPARATUS FOR VEHICLE

INCORPORATION BY REFERENCE

The disclosure of Japanese Patent Application No. 2005-337680 filed on Nov. 22, 2005, including the specification, drawings and abstract thereof, is incorporated herein by reference in its entirety.

BACKGROUND OF THE INVENTION

1. Field of the Invention

The present invention relates to a driving assist method and apparatus for a vehicle and, more particularly, to a braking assist method and apparatus.

2. Description of the Related Art

Driving assist apparatus for assisting driving operations are well known. A driving assist apparatus, for example as described in Japanese Unexamined Patent Application Publication No. 2002-163795, estimates a braking distance for a vehicle and gives obstacle information and driving guidance to a driver to avoid crashing against an obstacle ahead. The driving assist apparatus also detects an obstacle ahead, calculates the distance to the obstacle, as well as the braking distance of the vehicle, and alerts the driver to a potential crash.

However, the conventional apparatus described above simply informs the driver of the existence of the obstacle and the driver brakes the vehicle, so that the driver cannot predict the actual position where the vehicle will come to a stop. As a result, the driver must brake the vehicle relying upon his/her experience and common sense, taking into consideration the braking force and deceleration of the vehicle.

SUMMARY OF THE INVENTION

Accordingly, it is an object of the present invention to provide a driving assist method and a driving assist apparatus for displaying a position at which the vehicle speed will become a predetermined speed according to deceleration of the vehicle, to assist the driver to quickly adjust his/her operation of the vehicle.

To solve the problems described above, the present invention provides a driving assist method for a vehicle comprising the steps of calculating a position at which a vehicle speed will have decelerated to a predetermined speed and superimposing that calculated position as an arrival indicator on a map display. Therefore, the driver may observe the position at which the vehicle speed will become the predetermined speed with braking of the vehicle, so that the driver may quickly adjust his/her operation of the vehicle.

The driving (braking) assist method of the present invention includes the steps of locating an object in front of the vehicle, specifying the position of the located object, calculating the position at which the vehicle speed will become a predetermined speed based on deceleration of the vehicle, generating an arrival indicator based on that calculated position of the vehicle, and displaying the arrival indicator. Therefore, the driver may visually determine the distance, calculated for the predetermined speed, the vehicle will be from the location of the object, again allowing the driver to quickly adjust his or her operation of the vehicle.

Preferably, the predetermined speed is 0 kilometers per hour, i.e. a complete stop.

In another embodiment, wherein a plurality of predetermined speeds are set in advance and the driving assist method displays plural, individual arrival indicators, respectively indicating positions at which the vehicle speed will become each of the plurality of the predetermined speeds, on the map display.

Location of an object in front of the vehicle may be determined at any given time, with simultaneous display of the position of the object, an object indicator indicating the object and an arrival indicator, together in a road map screen on a display device. Therefore, the driver may visually determine both the position at which the vehicle speed will become the predetermined speed and the position of the object and may quickly adjust operation of the vehicle.

The present invention also provides a driving (braking) assist apparatus-comprising a final position calculating device (means) for calculating a position at which the vehicle speed will become a predetermined speed on the basis of vehicle position and deceleration of the vehicle, and a display control device (means) for displaying an arrival indicator indicating the position calculated by the final position calculating device on a road map. The apparatus, as noted above, allows the driver to visually check the position at which the vehicle speed will become the predetermined speed given the deceleration of the vehicle, so that the driver may quickly adjust operation of the vehicle.

The final position calculating device may initiate calculation of the position at which the vehicle speed will become the predetermined speed responsive to operation of the brakes, slowing of the vehicle or downshifting.

In one preferred embodiment, the final position calculating device calculates the position at which the vehicle will come to a stop. Therefore, responsive to slowing of the vehicle, the stop position of the vehicle is displayed on a road map on the display device.

In another embodiment, the final position calculating device (means) calculates each position at which the vehicle speed will become one of a plurality successively slower predetermined speeds, and the display control device individually displays arrival indicators respectively indicating the plural positions, calculated by the final position calculating device, on the road map display presented on the display device.

The display control device may display, on the display device, an object indicator indicating the position of the object calculated by the object position calculating device together with the arrival indicator indicating the final position, whereby the driver may visually determine the relationship between the arrival indicator and the object indicator and adjust his or her driving operation.

The driving (braking) assist apparatus may include object position calculating means for calculating the position of an object located in front of the vehicle, final position calculating means for calculating the position at which vehicle speed will become a predetermined speed on the basis of vehicle position and deceleration of the vehicle, converting means for converting the position calculated by the final position calculating device to a value based on the object position calculated by the object position calculating means, and display control means for displaying the converted value on a display means (device). The position at which the vehicle speed is calculated to become the predetermined speed is converted to an arrival indicator indicating a value based on the position of the object and displayed on the display means, so that the driver may visually determine the distance of the position at which the vehicle speed will become the predetermined speed from the position of the object, again allowing the driver quickly adjust his or her driving operation.

The final position calculating means calculates the position at which vehicle speed will become a predetermined speed provided at least a precondition of brake operation is satisfied. Therefore, when the driver brakes, the (calculated) position at which the vehicle speed will become the predetermined speed is used to generate an arrival indicator which is displayed on the display means.

DESCRIPTION OF THE PREFERRED EMBODIMENTS

An embodiment of the present invention is described with reference to FIGS. 1A to 5 below.

Figure 1A:
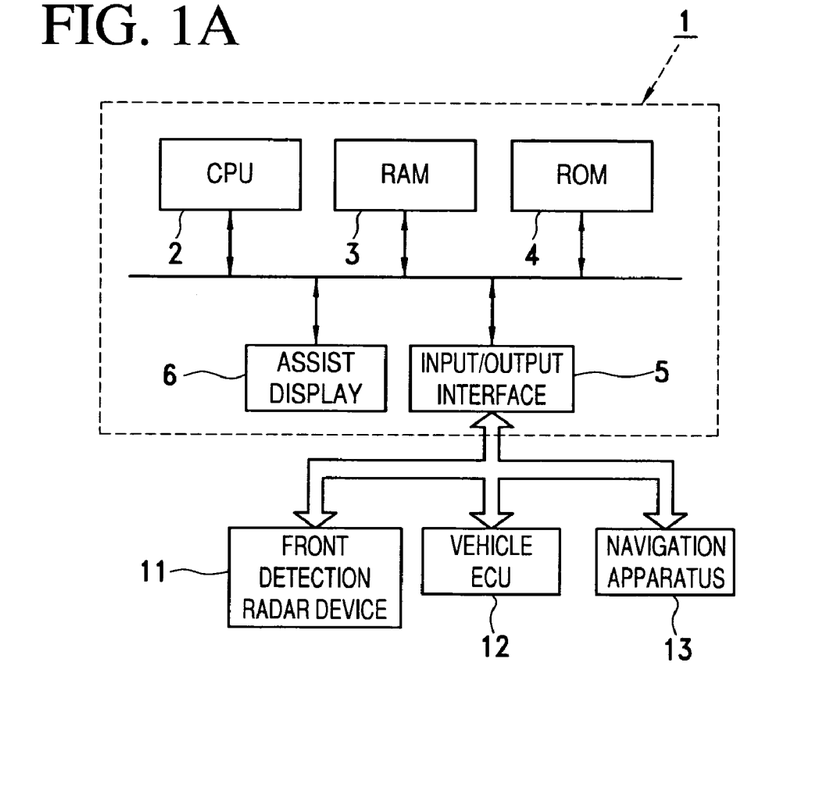
FIG. 1A is a block diagram of a driving assist apparatus according to the present invention.
Figure 1B:
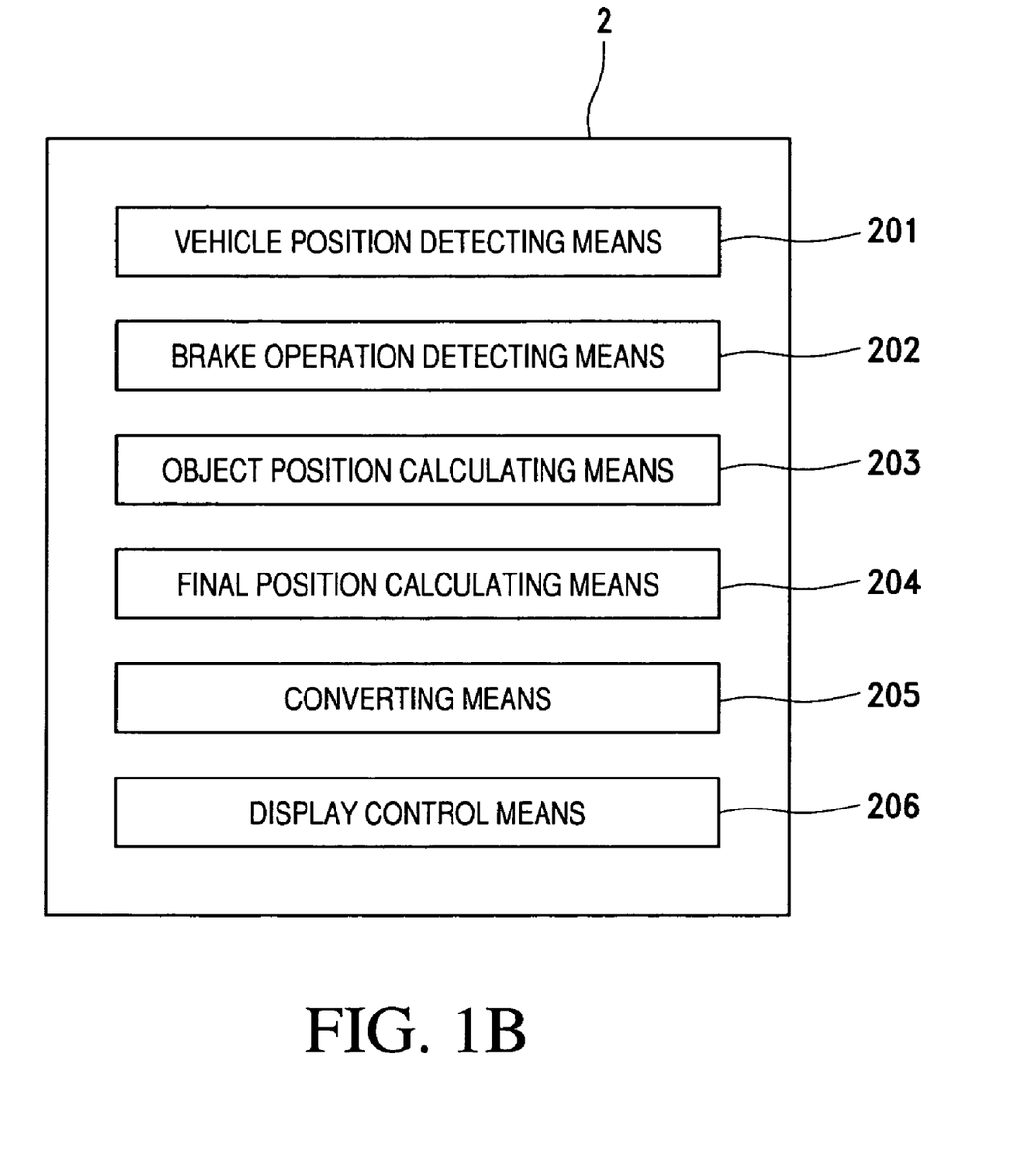
FIG. 1B is a block diagram of the CPU 2 shown in FIG. 1A.

FIG. 1A is a block diagram, in accordance with an embodiment of the present invention, of a driving assist apparatus mounted on a vehicle. The driving assist apparatus 1 in FIG. 1A, as shown in FIG. 1B, includes a CPU 2 with vehicle position detecting means 201, brake operation detecting means 202, object position calculating means 203, final position calculating means 204, converting means 205, and display control means 206. The driving assist apparatus 1 further includes, as shown in FIGS. 1A and 1B, an RAM 3 temporarily storing calculations by the CPU 2, a ROM 4 with various stored driving assist programs such as a driving assist program for braking, an input/output interface 5, and an assist display 6.

Figure 2:
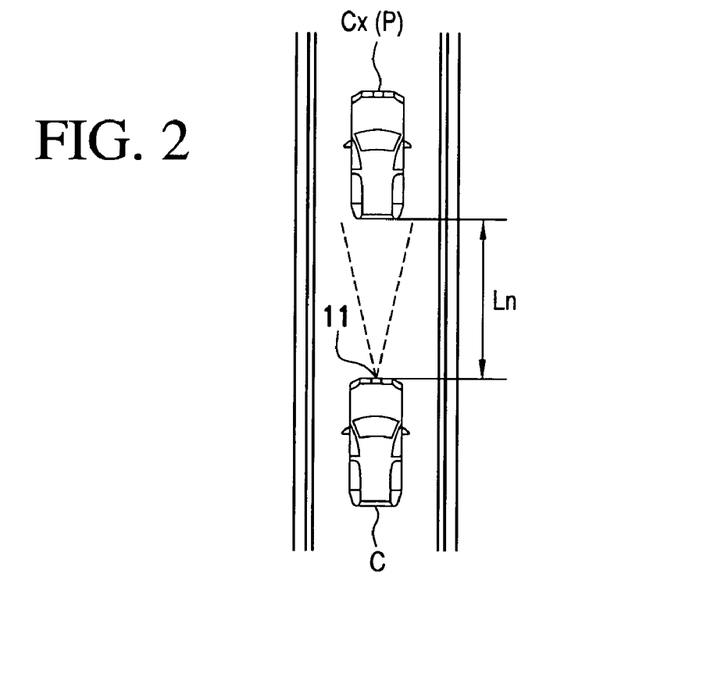
FIG. 2 is a diagram showing a front detection radar device.

The CPU 2 connects to a front detection radar device 11 through the input/output interface 5. In the present embodiment, the front detection radar device 11 is a millimeter wave radar. As shown in FIG. 2, the front detection radar device 11 is mounted on a front grille of vehicle C, emits a millimeter wave forward from the vehicle, receives the reflected wave, detects a vehicle Cx ahead and/or an object P such as a fallen object, and calculates the distance Ln to the object P and the speed of the vehicle relative to the object. The CPU 2 requests and obtains the distance Ln and the relative speed P calculated by the front detection radar device 11 at different times, e.g. at a set time interval.

The CPU 2 is connected to a vehicle electronic control device (vehicle ECU) 12 through the input/output interface 5. The vehicle ECU 12 controls the drive systems of the vehicle C and receives as input signals from various sensors and switches such as an ignition switch, a steering sensor, a speed sensor, an accelerator operation sensor, and a brake operation sensor. The vehicle ECU 12 calculates the vehicle speed Vn, the degree of accelerator opening, steering angle, and a braking level $\theta n$ of the vehicle C at different times, e.g. at a set interval, on the basis of the signals from the sensors. Then the CPU 2 requests and obtains the vehicle speed Vn, the braking level $\theta n$ (pedal angle), and on/off signals of the ignition switch, at different times, from the vehicle ECU 12.

The CPU 2 connects to a navigation apparatus 13 through the input/output interface 5. The navigation apparatus 13 calculates the position DP of the vehicle C and displays the position DP on a map screen on a display (not shown) in the navigation apparatus 13 and/or searches for a route to a destination and displays the route determined by the search on the map to guide the driver. Then, the CPU 2 requests and obtains the vehicle position DP which is calculated by the navigation apparatus 13 at any given time and/or a route and map data stored in the navigation apparatus 13. The CPU 2 also obtains feature information for features located in advance of the vehicle C (for example, coordinates of an intersection, coordinates of a stop sign, coordinates of a crosswalk, and/or coordinates of a road corner) from route data and/or road data stored in the navigation apparatus 13. On the basis of the information received from the navigation apparatus 13, the CPU 2 detects the object P (a feature such as an intersection, a stop sign, a crosswalk, or a road corner) located in front of the vehicle C.

The CPU 2 then determines whether or not the detected object P will have some impact on driving operation at a certain time, i.e. whether not driving must be adjusted to cope with the detected object P. In the present embodiment, the object P which is located closest to the vehicle C within a predetermined distance Lk will be referred to as "specified object Px."

After determining the presence of a specified object Px, when braking is detected, the CPU 2 next determines whether the "braking assistance mode" should be selected based on the vehicle speed Vn, the distance Ln to the specified object Px, and the presence or absence of brake pedal operation. That is, the CPU 2 determines whether or not driving assist guidance is necessary for the driver. In the present embodiment, it may be determined that driving assist guidance is unnecessary even though the driver has applied braking, e.g. when a brake operation enables the vehicle to stop immediately. More specifically, when there is no specified object Px ahead or when the vehicle C is traveling at a speed Vn which is slow enough for the driver to stop the vehicle immediately, it is determined that driving assistance in braking is not necessary.

Figure 3:
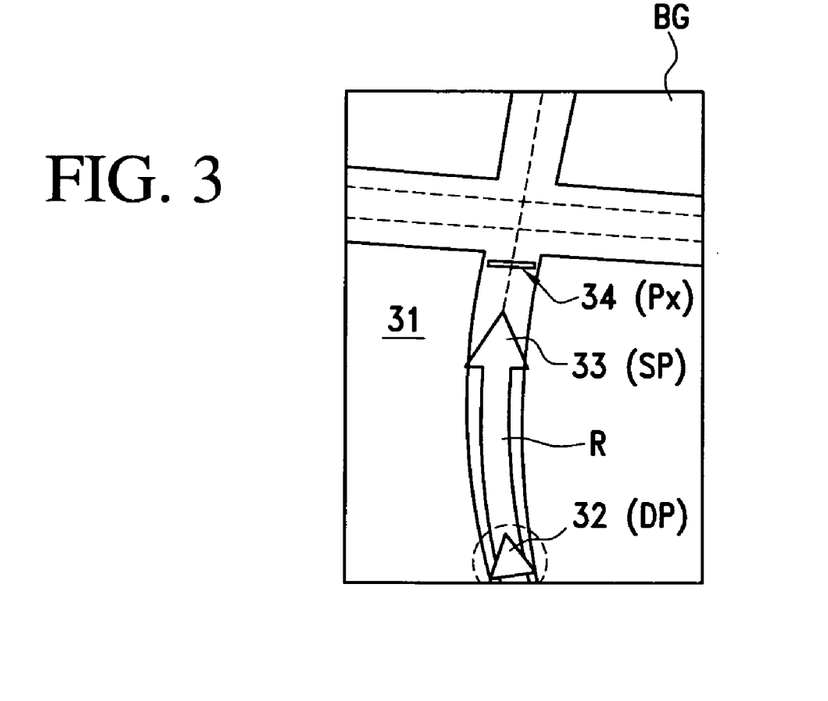
FIG. 3 is a diagram showing a braking assist image.
Figure 4:
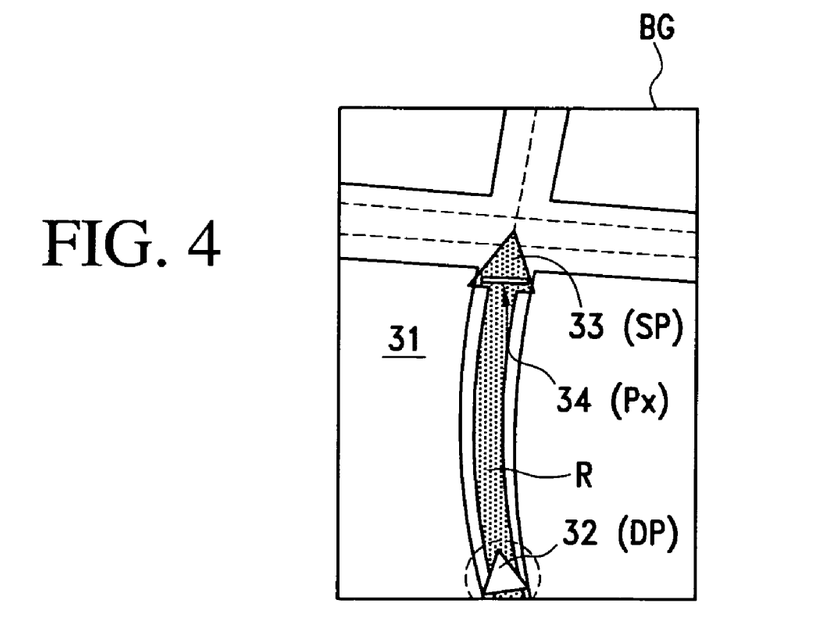
FIG. 4 is a diagram showing another braking assist image.

The CPU 2 is connected to an assist display 6 as display means. The assist display 6 is a full-color LCD display device. When the CPU 2 is in a "braking assistance mode", the CPU 2 displays a braking assist image BG as shown in FIGS. 3 and 4. The braking assist image BG is a display with an indicator of a stop position SP, the final position of the vehicle C calculated according to the deceleration, e.g. when the vehicle brakes for parking. The braking assist image includes a route R to the stop position SP of the vehicle C, a vehicle position indicator 32 indicating the current vehicle position C, a stop position indicator 33 indicating a calculated stop position SP, and an object indicator 34 indicating the position of the specified object Px, on a map 31.

The CPU 2 displays the route R to the stop position SP of the vehicle C in one of different colors selected according to (1) a determination that the stop position SP will be a distance from the vehicle C that is less than the distance from the vehicle C to the specified object Px or (2) a determination that the stop position SP will be located at a distance from the vehicle C that is equal to or greater than the distance from the vehicle C to the specified object Px. More specifically, as shown in FIG. 3, when the stop position SP will be a distance from the vehicle C that is less than the distance from the vehicle C to the specified object Px, the route R from the vehicle position indicator 32 to the stop position indicator 33 is displayed in blue. On the other hand, when the stop position SP will be a distance from the vehicle C that is equal to or greater than the distance from the vehicle C to the specified object Px as shown in FIG. 4, the route R from the vehicle position indicator 32 to the stop position indicator 33 is displayed in red.

Figure 5:
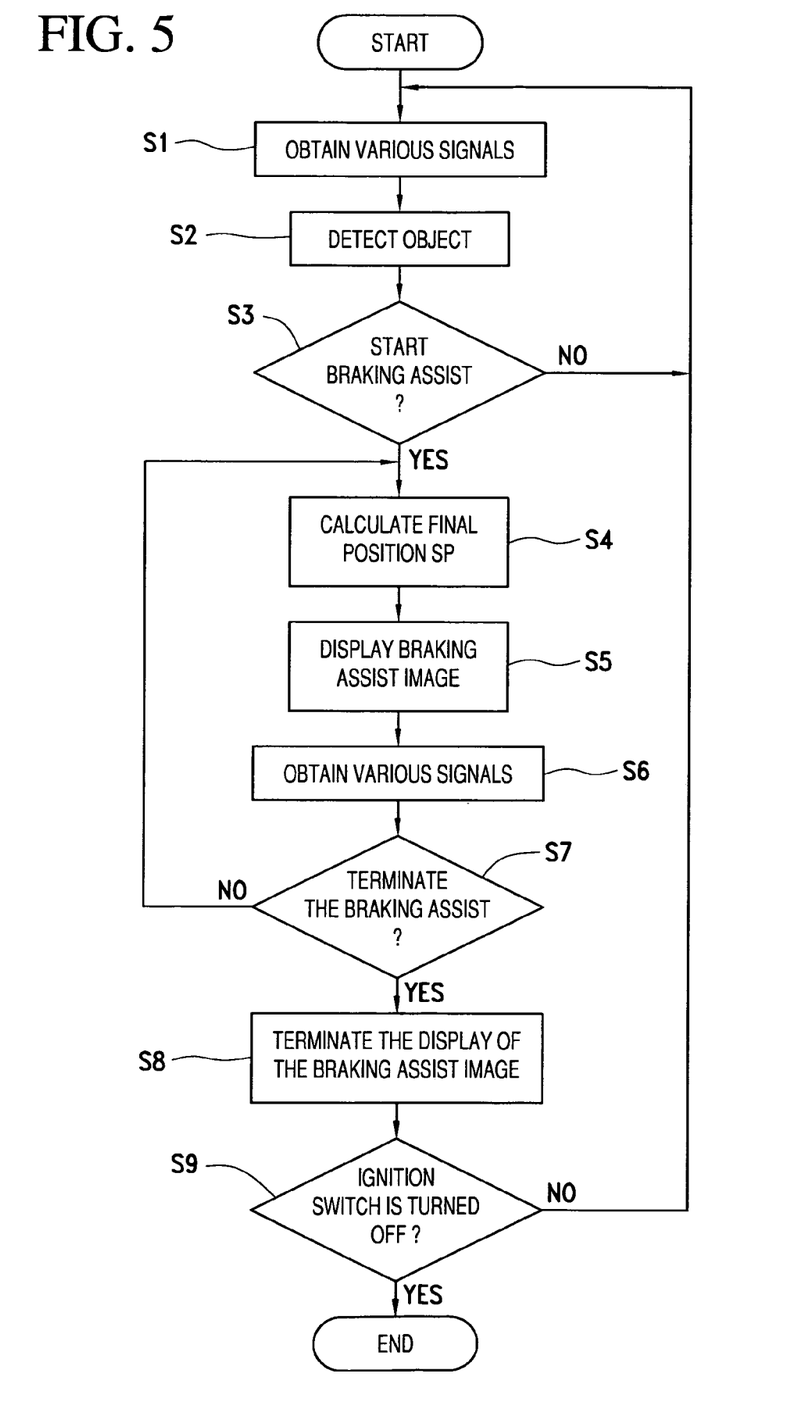
FIG. 5 is a flowchart of an embodiment of the driving assist method of the present invention.

Next, the operation of the braking assist apparatus 1 will be described with reference to the flowchart of FIG. 5. When the braking assist apparatus 1 is activated upon receiving an on-signal from the ignition switch, the CPU 2 obtains various signals and information from the front detection radar device 11, the vehicle ECU 12, and the navigation apparatus 13 (Step S1). The CPU 2 obtains the distance Ln to the object P and the speed of the vehicle relative to the object P from the front detection radar device 11. The CPU 2 obtains the vehicle speed Vn of the vehicle C from the vehicle ECU 12, the value θn for operation of the brake pedal and the position DP of the vehicle C from the navigation apparatus 13.

At this point in execution of the routine shown in FIG. 15, the navigation apparatus 13 displays a road guide image including a road map and an indicator indicating the vehicle position DP, based on the calculated (or detected) vehicle position DP, on a display monitor in the navigation apparatus 13. However, there is no image on the assist display 6 at this point.

Next, the CPU 2 specifies an object (Step S2). The CPU 2 detects an object P (feature) that is a predetermined distance ahead of the vehicle C such as a stop line, an intersection, or a starting point of a curve, on the basis of the calculated vehicle position DP and map data. When the object P is detected, the CPU 2 calculates the distance Ln from the vehicle position DP to the object P. In the present embodiment, the CPU 2 selects the one object P which is the shortest distance Ln from the vehicle position DP (that is, the object P is the closest to the vehicle C) from among a plurality of objects P determined as described above as well as objects P detected by the front detection radar device 11, and designates that one object P as the specified object Px. Then, the CPU 2 temporarily stores the distance Ln from the vehicle position DP to the specified object Px as a specified object distance in the RAM 3.

Next, the CPU 2 determines whether or not "the braking assist mode" should be executed or not (Step S3). The CPU 2 determines whether "the braking assist mode "braking" should be executed on the basis of the degree of braking level θn, the vehicle speed Vn, and the distance Ln from the specified object distance Ln at a given time. In the present embodiment, the CPU 2 chooses the "braking assist mode", provided that the vehicle speed Vn is equal to or greater than a predetermined speed Vk (for example, 5 kilometers per hour), that the distance Ln to the object is equal to or less than a predetermined distance Lk (for example, 200 meters), and that the degree of braking θn is greater than a predetermined value θk (=0) (e.g. when the driver starts to depress the brake pedal). The CPU 2 does not select the "braking assist mode" unless all three of the foregoing conditions are satisfied.

When the "braking assist mode" is not selected (Step S3=NO), the routine returns to Step S1 and the CPU 2 obtains new signals and information from the vehicle ECU 12 and the navigation apparatus 13, and updates the vehicle position DP, the vehicle speed Vn, the degree of braking θn, the specified distance Ln to the object, etc.

When the "braking assist mode" is selected (Step S3=YES), the CPU 2 calculates the stop position SP at which the vehicle C will stop given braking providing a moving average deceleration Aav (see below), that is, the position at which the vehicle speed Vn will become 0 (Step S4). More specifically, when braking is initiated, the CPU 2 calculates deceleration per unit time "a" using the following equation (1).

$$a = (Vb - Va)/(tb - ta) \qquad (1),$$

wherein Vb is the vehicle speed at a time tb and Va is the vehicle speed at a time ta (ta is before tb).

The CPU 2 calculates "n" number of consecutive decelerations "a" per unit time (a1, a2, ..., an), and calculates "n" number of moving average decelerations Aav using the following equation (2).

$$Aav = (a1 + a2 + \ldots + an)/n \qquad (2)$$

After calculating the moving average deceleration Aav, the CPU 2 calculates a braking distance Sa using the following equation (3).

$$Sa = (Ve^2 - V0^2)/(2Aav) \qquad (3),$$

Wherein V0 is an initial braking speed. In the present embodiment, V0 is the vehicle speed Vn when the "braking assist mode" is selected and Ve is the ending speed. In the present embodiment, Ve is the vehicle speed Vn (=0) when the vehicle C stops, so that Ve is "0".

After calculating the braking distance Sa, the CPU 2 next calculates the stop position SP of the vehicle C. The stop position SP of the vehicle C may be determined by using the vehicle position DP at a given time and map data. The CPU 2 temporarily stores the determined stop position SP in the RAM 3.

After calculating the stop position SP, the CPU 2 displays the map 31 including the route R to the stop position SP of the vehicle C on the assist display 6. Further, the CPU 2 superimposes, on the map display, the braking assist image BG with the vehicle position indicator 32 indicating the current vehicle C and the stop position indicator 33 indicating the stop position SP (Step S5). At this time, the CPU 2 reads out the specified object distance Ln stored in the RAM 3 and finds the position of the specified object Px. Then, the CPU 2 displays the object indicator 34 indicating the position of the specified object Px on the map 31 of the assist display 6.

When the stop position SP will be at a distance from the vehicle C that is less than the distance from the vehicle C to the specified object Px, the CPU 2 displays the route R from the vehicle position indicator 32 to the stop position indicator 33 in blue as shown in FIG. 3. When the stop position SP will be at a distance from the vehicle C that is equal to or greater than the distance from the vehicle C to the specified object Px, the CPU 2 displays the route R from the vehicle position indicator 32 to the stop position indicator 33 in red as shown in FIG. 4.

Therefore, the driver may determine the stop position SP by visually checking the stop position indicator 33 on the map 31 of the assist display 6. Further, because the object indicator 34 is displayed, the driver will understand the relative position between the stop position indicator 33 and the object indicator 34, so that the driver may visually determine whether the vehicle C will, with braking, overrun the specified object Px or stop before hitting the specified object Px.

Subsequently, the CPU 2 obtains new signals and information from the front detection radar device 11, the vehicle ECU 12, and the navigation apparatus 13 (Step S6) and determines whether or not the "braking assist mode" should be terminated (Step S7). The CPU 2 updates the braking θn, the vehicle speed Vn, and the specified object distance Ln and determines whether or not the "braking assist mode" should be continued on the basis of the updated degree of braking (braking level) θn, the vehicle speed Vn, and the specified object distance Ln. In the present embodiment, the CPU 2 chooses the "braking assist mode", provided that the vehicle speed Vn is equal to or greater than a predetermined vehicle speed Vk, that the object distance Ln is equal to or less than a predetermined distance Lk, and that the braking θn is greater than a predetermined value θn (=0) (a braking operation is executed). The CPU 2 does not choose the "braking assist mode" unless all three of the foregoing conditions are satisfied.

During braking (Step S7=NO), the procedure returns to Step S4 and the CPU 2 updates the stop position SP and displays the new braking assist image BG on the assist display 6 on the basis of the updated stop position SP (Step S5). That is, the CPU 2 changes the display of the vehicle position indicator 32 and the stop position SP of the vehicle C as the braking operation changes.

The "braking assist mode" is terminated when the braking operation is terminated (Step S7=YES). The CPU 2 terminates the display of the braking assist image BG (Step S8) and determines whether an on/off signal from the ignition switch is "off" (Step S9). When the signal from the ignition switch is "on" (Step S9=NO), the procedure returns to Step S1 and the CPU 2 restarts the braking assist routine.

When the signal from the ignition switch is "off" (Step S9=YES), the CPU 2 determines that the braking operation is terminated and terminates execution of the braking assist routine.

The embodiment described above, offers the following advantages.

1) The driving assist apparatus 1 superimposes the stop position indicator 33 indicating the stop position SP on the map 31 so that the driver may visually determine the stop position SP on the assist display 6, so that the driver may quickly adjust his driving (braking) operation.

2) Because the vehicle position indicator 32 and the object indicator 34 are displayed together on the assist display 6, the driver may visually determine the relative positions of the stop position indicator 33 and the object indicator 34 and the relative positions of the vehicle position indicator 32 and the object indicator 34 and may quickly adjust his/her driving (braking) operation accordingly.

3) Because only the braking assist image BG is (exclusively) displayed on the assist display 6 (a separate display), it may be easier and quicker for the driver to understand the image, as compared with use of a display device for other images.

4) The display of the braking assist image BG is different when the stop position SP is in front of the specified object Px as contrasted with that when the stop position SP overruns the specified object Px. More specifically, because when the stop position SP is in front of the specified object Px, the route R from the vehicle position indicator 32 to the stop position indicator 33 is displayed in blue and when the stop position SP overruns the specified object Px, the route R from the vehicle position indicator 32 to the stop position indicator 33 is displayed in red, the driver may visually determine the current situation and quickly adjust his/her driving (braking) operation accordingly.

5) Because the "braking assist mode" is selected only when the vehicle speed Vn is equal to or greater than a predetermined speed Vk, the object distance Ln is equal to or less than a predetermined distance Lk, and braking has been initiated, the braking assist image BG is not displayed when there is no need for braking assist guidance, e.g. when a braking operation enables the vehicle to be stopped immediately. More specifically, when there is no specified object Px ahead or when the vehicle C is traveling at or below the speed Vn, which is slow enough to stop immediately, the braking assist image BG is not displayed. Therefore, the braking assist image BG is not displayed unless it is needed, even if braking has been initiated.

While in the foregoing embodiment, the braking assist image BG is displayed on an exclusive display, i.e. is, the assist display 6, the braking assist image BG may be displayed on a display screen of the navigation apparatus 13 or on a display also used for display of other images.

While in the foregoing embodiment, the "braking assist mode" is selected only when the vehicle speed Vn is equal to or greater than a predetermined speed Vk, the object distance Ln is equal to or less than a predetermined distance Lk, and the braking operation is initiated, the "braking assist mode" may be selected when a braking operation is executed, regardless of other conditions. The "braking operation" may operation of a brake pedal or a shift of the transmission gear ratio such as downshifting for engine braking.

While in the foregoing embodiment, braking is one of the conditions for selecting the "braking assist mode", that condition may be simply the slowing of the vehicle. For example, deceleration of the vehicle C at any given time may be calculated, and the "braking assist image" may be displayed at the time when a calculated deceleration becomes greater than a predetermined deceleration.

In the foregoing embodiment, after the "braking assist mode" is selected, "n" number of decelerations "a" (a1, a2, . . . , an) are continuously determined, and the moving average deceleration Aav is calculated. However, "n" number of decelerations (a1, a2, . . . , an) may be continuously updated, regardless of whether or not in the braking assist mode. With such continuous updating, the moving average deceleration Aav may be calculated immediately upon selection of the braking assist mode. Further, the moving average deceleration Aav may be continuously (always) calculated and the braking distance Sa may be calculated immediately upon selection of the braking assist mode. Further, the braking distance Sa may be calculated based on, not the moving average deceleration Aav, but on only one of the decelerations a.

In the foregoing embodiment, the braking assist apparatus 1 (the CPU 2) calculates the deceleration "a" or the moving average deceleration Aav. However, the vehicle ECU 12 may be used to calculate the deceleration "a" and/or the moving average deceleration Aav, with the CPU 2 obtaining the deceleration "a" or the moving average deceleration Aav calculated by the vehicle ECU 12 and calculating the braking distance Sa on the basis of the obtained deceleration "a" or the moving average deceleration Aav.

Figure 6:
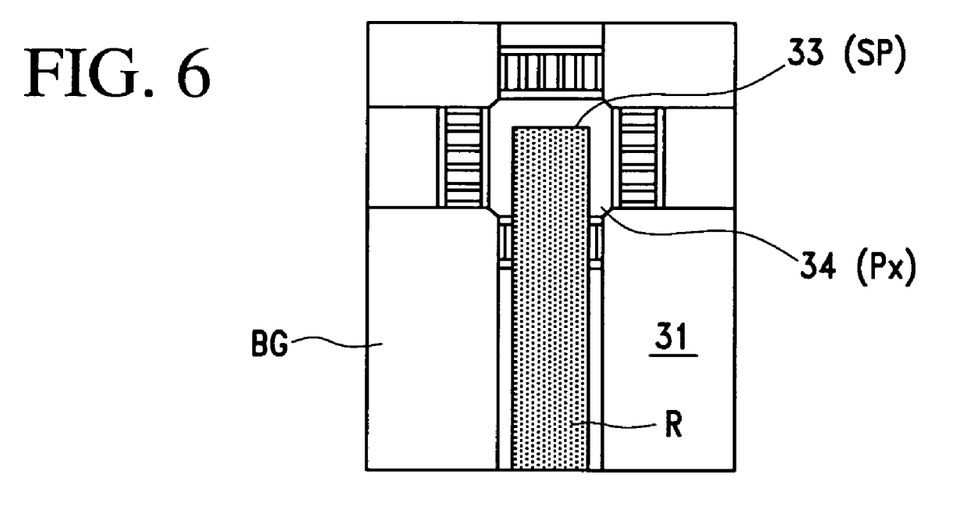
FIG. 6 is a diagram showing another braking assist image.
Figure 7:
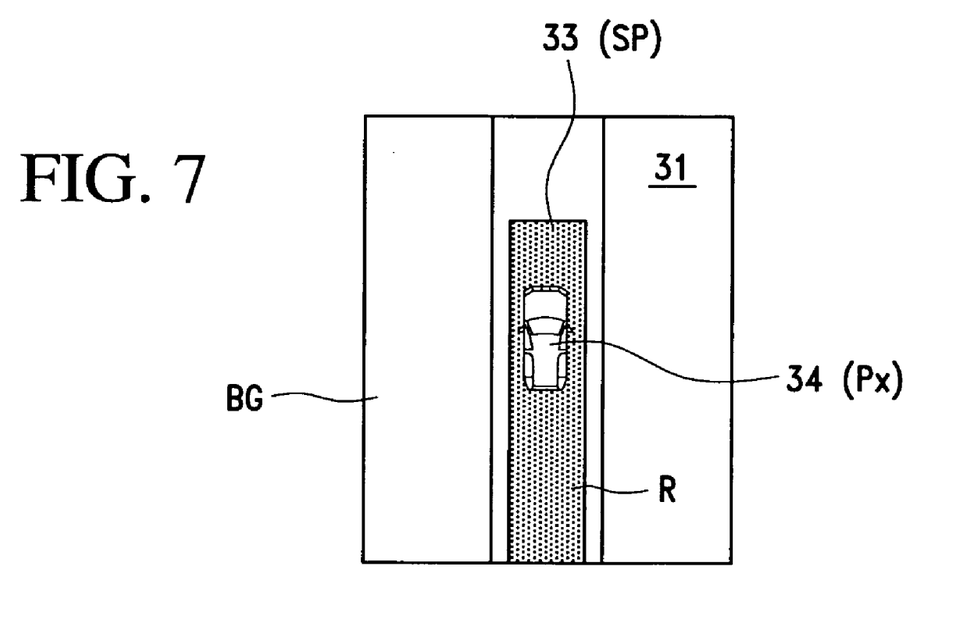
FIG. 7 is a diagram showing yet another braking assist image.

In the foregoing embodiment, the braking assist image BG includes the route R and the vehicle position indicator 32 superimposed on the map 31 showing the actual shape of the road on which the vehicle is currently traveling and is displayed on the assist display 16 as shown in FIGS. 3 and 4. However, instead of the actual road shape, the map 31 may be simplified to display the roads as straight lines, as shown in FIGS. 6 and 7, with the route R, the vehicle position indicator 32, and the object indicator 34 included in the map display 31.

In the foregoing embodiment, the stop position indicator 33 displayed on the braking assist image BG indicates the stop position SP of the vehicle C. However, instead, a position at which the speed of the vehicle C will become a predetermined speed, for example 5 kilometers per hour or 10 kilometers per hour, may be displayed as a final position indicator.

Figure 8:
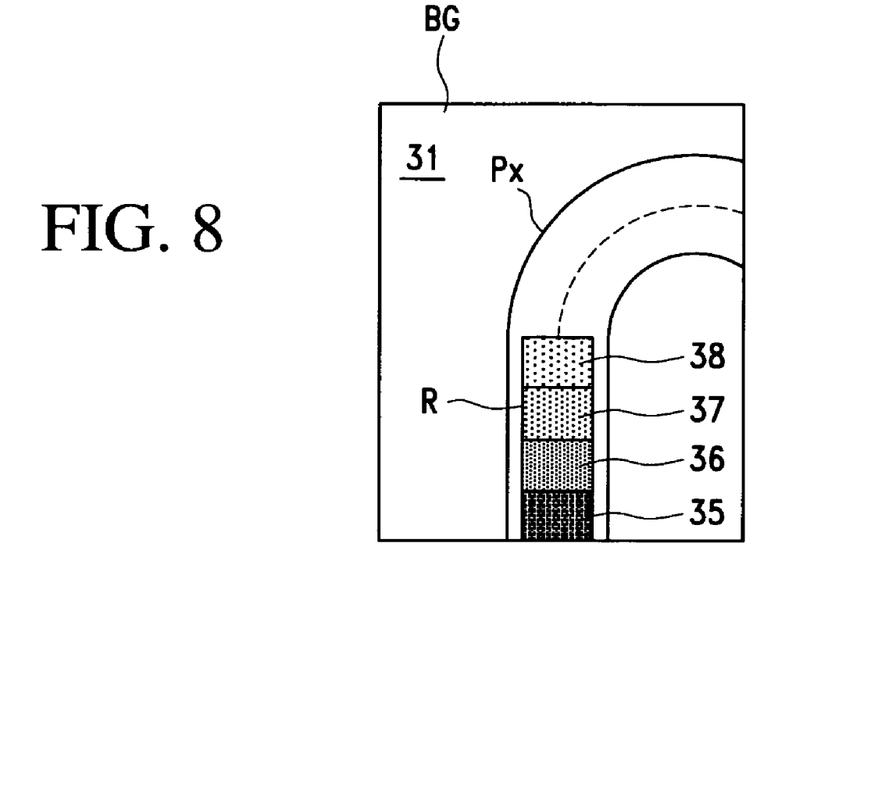
FIG. 8 is a diagram showing another braking assist image.
Figure 9:
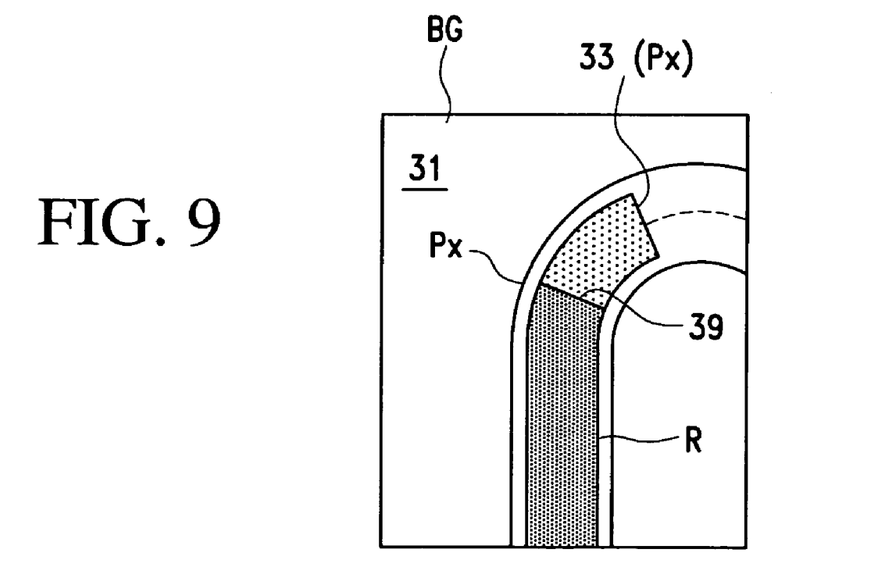
FIG. 9 is a diagram showing still another braking assist image.

Further, as shown in FIG. 8, a plurality of predetermined positions at which the speed of the vehicle C becomes a predetermined speed (final positions), for example, 15 kilometers per hour, 10 kilometers per hour, 5 kilometers per hour, and 0 kilometers per hour, may be displayed as the final position indicators 35, 36, 37, and 38. Further, the braking assist image BG in FIG. 9 shows the beginning of a curve as the specified object Px and an arrival indicator 39 which indicates the position at which the speed of the vehicle C will become a predetermined speed (final position), thus allowing the driver to visually determine a proper vehicle speed Vn for entering the curve.

Figure 10:
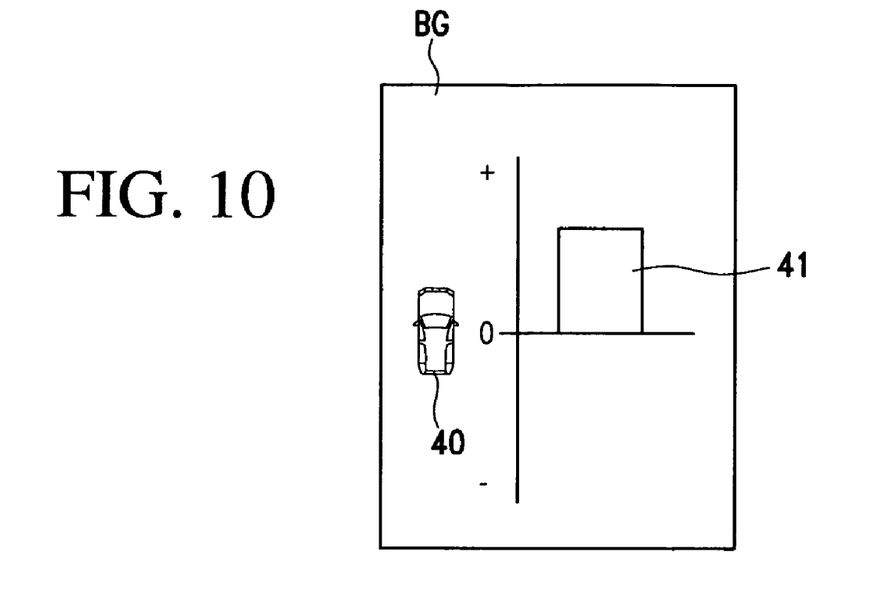
FIG. 10 is a diagram showing another braking assist image.
Figure 11:
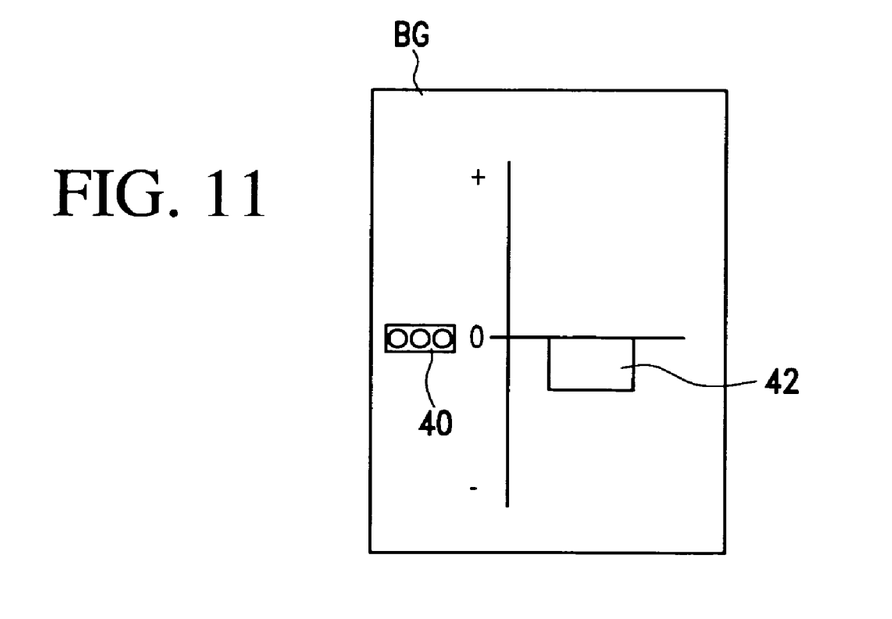
FIG. 11 is a diagram showing another braking assist image.

While, in the foregoing embodiment, the braking assist image BG is a the map 31 with the route R to the stop position SP of the vehicle C and the stop position indicator 33 indicating the stop position SP superimposed thereon, as shown in FIGS. 10 and 11, the CPU 2 may include data converting means for calculating the distance of the stop position SP in front of or overrunning the position of the specified object Px, and such distances may be displayed, as an indicator 41 or 42, as the braking assist image BG on the assist display 6. In this modification, the CPU 2 may compare the distance Ln to the specified object Px and the braking distance Sa. When the braking distance Sa is longer than the distance Ln, the indicator 41 indicating the difference (=Sa−Ln) may be displayed in the upper portion of the braking assist image as shown in FIG. 10. When the braking distance Sa is shorter than the distance Ln, the indicator 42 indicating the difference (=Ln−Sa) may be displayed in the bottom portion of the braking assist image as shown in FIG. 11, so that the driver may visually determine the distance of the stop position from the object indicator 40.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving assist method for assisting a driver in decelerating a vehicle by generating a display on a display means mounted in the vehicle, comprising:
   determining a current position of the vehicle;
   calculating a position at which a vehicle speed will become a predetermined speed based on deceleration of the vehicle;
   displaying the calculated position as an arrival indicator on a road map display of the display means, whereby the driver, viewing the display of the calculated position at which the vehicle speed will become the predetermined speed, is able to adjust his or her driving operation based on the display on the display means;
   detecting an object located in front of the vehicle, specifying the position of the detected object, and generating an object indicator indicating the specified position of the object;
   determining a distance from the determined current position to the position of the detected object as a first distance and the distance from the determined current position to the calculated position as a second distance;
   comparing the first distance with the second distance to determine which is greater;
   displaying the object indicator together with the arrival indicator, superimposed on the road map display; and
   displaying, on the road map display, a route section from the current vehicle position to the calculated position in a first color when the first distance is greater than the second distance and in a second color, different from the first color, when the second distance is greater than the first distance.

2. The driving assist method according to claim 1, wherein: the predetermined speed is 0 kilometers per hour.

3. The driving assist method according to claim 1, wherein: a plurality of predetermined speeds are set in a memory and arrival indicators indicating positions at which the vehicle speed will become each of the plurality of the predetermined speeds are individually displayed, superimposed on the road map.

4. A driving assist method for assisting a driver in decelerating a vehicle by generating a display on a display means mounted in the vehicle, comprising:
   detecting an object located in front of the vehicle;
   specifying the position of the detected object;
   calculating a position at which the vehicle speed will become a predetermined speed based on deceleration of the vehicle; and
   converting the calculated position to an arrival indicator indicating a value based on the position of the detected object and indicating whether the calculated position is on the near side or the far side of the position of the detected object; and
   displaying the arrival indicator on the display means, whereby the driver, viewing the displayed arrival indicator, is able to adjust his or her driving operation based on the display on the display means.

5. The driving assist method according to claim 4, wherein: the predetermined speed is 0 kilometers per hour.

6. The driving assist method according to claim 4 additionally comprising:
   generating an object indicator indicating the specified position of the object, and
   displaying the object indicator and the arrival indicator together, superimposed on the road map.

7. The driving assist method according to claim 4, wherein the arrival indicator is a graph showing distance of the detected object relative to the calculated final position of the vehicle.

8. A driving assist apparatus for assisting a driver in decelerating a vehicle, comprising:
   vehicle position determination means for determining a current position of the vehicle;
   object detecting means for detecting an object located in front of the vehicle;
   object position calculating means for calculating the position of the detected an object located in front of the vehicle;
   calculating means for calculating a final position at which a vehicle speed will become a predetermined speed based on vehicle position and deceleration of the vehicle, for determining a distance from the determined current position to the position of the detected object as a first distance and the distance from the determined current position to the calculated position as a second distance and for comparing the first distance with the second distance to determine which is greater;
   display means for displaying a road map; and
   display control means for displaying an arrival indicator indicating the calculated final position together with an object indicator indicating the calculated position of the object together simultaneously superimposed on the displayed road map and for displaying a route section from the current position of the vehicle to the calculated position in a first color when the first distance from the determined current position to the position of the detected object is greater than the second distance from the determined current position of the vehicle to the final position and in a second color, different from the first color, when the second distance is greater than the first distance, whereby the driver, viewing the display of the arrival indicator at which the vehicle speed will become the predetermined speed, is able to adjust his or her driving operation based on the display.

9. The driving assist apparatus according to claim 8, wherein:
the final position calculating means calculates the position at which the vehicle speed will become the predetermined speed only when braking of the vehicle is detected.

10. The driving assist apparatus according to claim 9, wherein:
the final position calculating means calculates the position at which the vehicle will come to a stop.

11. The driving assist apparatus according to claim 8, wherein:
the final position calculating means calculates the position at which the vehicle will come to a stop.

12. The driving assist apparatus according to claim 8, wherein:
the final position calculating means calculates each position at which the vehicle speed becomes one of a plurality of predetermined speeds; and
the display control means displays individual arrival indicators, respectively indicating the plurality of positions calculated by the final position calculating means, superimposed on the displayed road map.

13. The driving assist apparatus according to claim 9, wherein:
the final position calculating means calculates each position at which the vehicle speed becomes one of a plurality of predetermined speeds; and
the display control means displays individual arrival indicators, respectively indicating the plurality of positions calculated by the final position calculating means, superimposed on the displayed road map.

14. A driving assist apparatus for assisting a driver in decelerating a vehicle, comprising:
vehicle position determining means for determining a current vehicle position;
object detecting means for detecting an object located in front of the vehicle;
object position calculating means for calculating the position of the detected an object located in front of the vehicle;
final position calculating means for calculating, as a final position, a position at which vehicle speed will become a predetermined speed based on the determined vehicle position and deceleration of the vehicle;
converting means for converting the calculated final position to an arrival indicator indicating a relationship between the calculated position of the object and the calculated final position of the vehicle;
display means for displaying a decelerating assist image; and
display control means for displaying the arrival indicator and an object indicator, indicating the calculated position of the object, on the display means, so that the driver is able to determine whether the calculated final position is on the far side or the near side of the calculated position of the object and to adjust his or her driving operation accordingly.

15. The driving assist apparatus according to claim 14, wherein:
the final position calculating means calculates a position at which a vehicle speed will become a predetermined speed responsive to satisfaction of conditions including braking.

16. The driving assist apparatus according to claim 14, wherein the arrival indicator is a graph showing distance of the detected object relative to the calculated final position of the vehicle.

* * * * *

UNITED STATES PATENT AND TRADEMARK OFFICE
CERTIFICATE OF CORRECTION

| | | |
|---|---|---|
| PATENT NO. | : 8,073,574 B2 | |
| APPLICATION NO. | : 11/603309 | |
| DATED | : December 6, 2011 | |
| INVENTOR(S) | : Yukio Yamamoto | |

It is certified that error appears in the above-identified patent and that said Letters Patent is hereby corrected as shown below:

Column 10, line 51 (claim 8, line 8), delete "an"; and

Column 12, line 10 (claim 14, line 8), delete "an".

Signed and Sealed this
Nineteenth Day of June, 2012

David J. Kappos
*Director of the United States Patent and Trademark Office*